July 22, 1947.　　　　C. S. HYATT ET AL　　　　2,424,315
FABRIC TUBE
Filed March 9, 1944
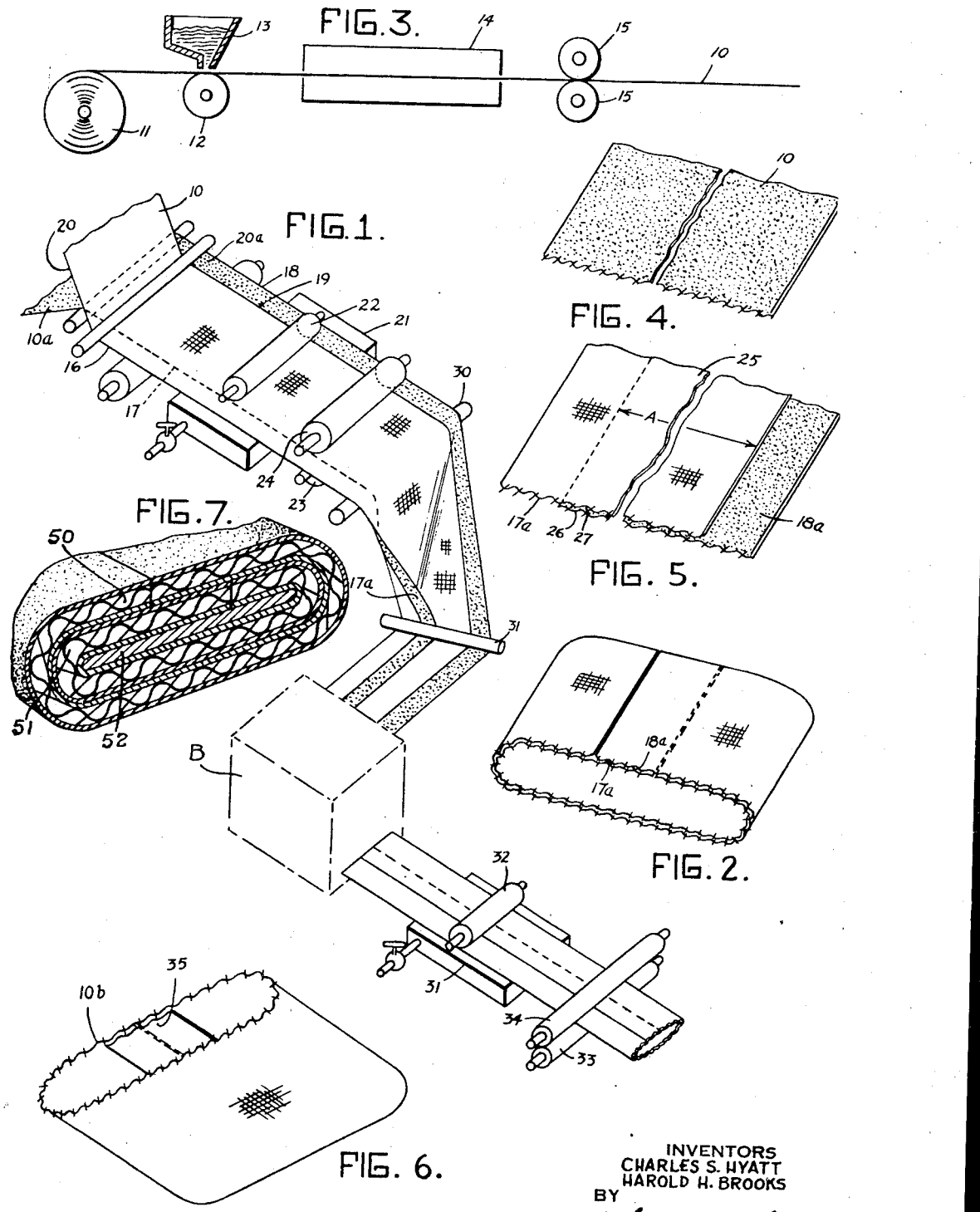
INVENTORS
CHARLES S. HYATT
HAROLD H. BROOKS
BY
Toulmin & Toulmin
ATTORNEYS Patented July 22, 1947

2,424,315

UNITED STATES PATENT OFFICE 2,424,315

FABRIC TUBE

Charles S. Hyatt and Harold H. Brooks, Columbus, Ohio, assignors to Columbus Coated Fabrics Corporation, Columbus, Ohio, a corporation of Ohio Application March 9, 1944, Serial No. 525,650

7 Claims. (Cl. 138—55)

This invention relates to fabric tubes, their construction and method of manufacture.

An object of the invention is to provide a method of manufacturing a tube from fabric materials, the walls of which are impermeable to fluids, either liquid or gaseous.

Another object of the invention is to provide a tube constructed from fabric materials that is constructed as a double walled structure wherein the inner and outer surfaces of the tube are fabric surfaces and a material is disposed between the walls of the tube to make the same impermeable to fluids and which also produces adherence between the walls of the tube.

A still further object of the invention is to provide a method of manufacturing a fabric tube in accordance with the foregoing object wherein the tube is formed from flat fabric sheets, or strips, in such a manner that the material disposed between the walls of the fabric tube produces adherence between an overlapping seam joint extending longitudinally of the tube whereby to provide impermeability to the seam joint.

Still another object of the invention is to provide a fabric tube, and a method of manufacturing same, wherein the fabric that goes into the construction of the tube is coated with a thermoplastic material on at least one side thereof, and which thermoplastic material provides the adhesive substance for securing opposite edges of a coated strip of the material together to form the tube and also provides impermeability to the tube for ordinary fluids.

Still another object of the invention is to provide a fabric tube, and a method for manufacturing the same, in accordance with the foregoing object wherein the fabric tube is constructed as a multiple walled structure in such a manner that the inner and outer surfaces of the tube can be fabric surfaces and the walls are caused to adhere together by means of the thermoplastic coating on the fabric.

Still another object of the invention is to provide a multiple walled fabric tube provided with a thermoplastic material between the walls to cause adherence between the walls and provide impermeability to the tube.

Further objects and advantages will become apparent from the drawings and the following description.

In the drawings:

Figure 1 is a schematic illustration of the process for producing the fabric tube of this invention.

Figure 2 is a transverse cross-sectional view of the completed fabric tube of this invention.

Figure 3 schematically illustrates a process for coating one side of a continuous fabric strip with themoplastic material.

Figure 4 is a perspective elevational view of a portion of the coated fabric strip.

Figure 5 is a perspective elevational view of the assembly of two fabric strips whereby to form a multiple walled structure that is subsequently formed into the fabric tube illustrated in Figure 2.

Figure 6 is a cross-sectional view of a modified structure of a fabric tube.

Figure 7 is a cross-sectional view of another modified structure of a fabric tube.

In general, the fabric tube of this invention is constructed from at least two strips of fabric material that have at least one side thereof coated with a thermoplastic material by any suitable process. The fabric strips are of any indeterminate length whereby the process of producing the tube may be a substantially continuous process. The two strips of coated fabric material are placed together so that the coated faces of the strips are in engagement. The strips are then passed through a suitable heating and pressing apparatus whereby the thermoplastic material that coats the surfaces of the strips is softened and adherence between the strips is produced by pressure applied thereupon. The strips of fabric material are laid with respect to one another so that a thermoplastic coated edge extends longitudinally along each side of the strip. These thermoplastic coated edges are then brought into engagement with one another and suitable heat and pressure applied thereupon to soften the thermoplastic material and cause adherence of the edges thus forming the tube. The fabric strips may be coated on both sides thereof if desired and a tube formed therefrom following the general procedure previously set forth.

More specifically, a strip of fabric material 10, a portion of which is shown in Figure 4, is coated on one side thereof with a thermoplastic material by any suitable process such as that illustrated in Figure 3. The strip of fabric material 10 is supplied from a supply roll 11 and is fed over a roller 12. A suitable supply of liquid thermoplastic material may be retained in the supply well 13, by which a liquid thermoplastic material is supplied to the upper surface of the fabric strip 10 as it passes over the roller 12 and beneath the supply well 13. The application of the thermoplastic material upon the surface of the fabric strip 10 may be carried out in any conventional manner, the method illustrated being only by way of illustration. It will be understood that in the method shown, the thermoplastic material is in a liquid form and contains a very high percentage of solvent so that the thermoplastic material can be evenly distributed over the surface of the fabric strip 10, and be readily applied.

The coated fabric strip 10 then passes through a dryer 14 wherein the solvent is driven from the thermoplastic material, thereby leaving a solid coating of thermoplastic material on the surface of the fabric strip 10. If desired, the coated fabric strip may then be passed between heated calender rolls 15 to press the plastic material into the fabric and smooth the surface thereof.

Now referring to Figure 1, a pair of fabric strips 10 and 10a prepared as previously described are brought together from suitable supply rolls so that the bottom thermoplastic coated surface 20 of the fabric strip 10 is placed in face engagement with the upper thermoplastic coated face 20a of the fabric strip 10a. It will be noted that the edge portion 16 of the fabric strip 10 extends beyond the edge portion 17 of the fabric strip 10a, and that the edge portion 18 of the fabric strip 10a extends beyond the edge portion 19 of the fabric strip 10, thereby providing an exposed coated surface 17a along one edge of the composite fabric strip and an exposed coated surface along the opposite edge of the composite fabric strip, the coated surfaces being disposed in opposite relationship as illustrated in Figure 5.

The composite fabric strip, consisting of the fabric strips 10 and 10a, is carried across a suitable heating table 21, such as a steam table, for heating the thermoplastic coating on the strips 10 and 10a to soften the same, the composite strip being retained in engagement with the heating table by the tension upon the fabric strips, or if desired a roller 22 can be provided to mechanically hold the strip upon the table. Immediately after passing from the heating table 21, the composite fabric strip passes between the pressure rolls 23 and 24, whereby the heated and softened thermoplastic material coated on the fabric strips 10 and 10a, and in face engagement, are pressed together to cause adherence between the fabric strips 10 and 10a. The rollers 23 and 24 are of a width to engage only that portion of the fabric strip between the exposed adhesive surfaces 17 and 17a.

The composite fabric strip, thus formed, is illustrated in Figure 5 wherein the main body of the strip indicated by the letter "A" is provided with a fabric upper surface 25 and a fabric lower surface 26. Thermoplastic material 27 is between the two fabric strips thereby producing a fabric sheet, or strip, having the main body portion thereof coated with an impermeable material which also causes adherence between the fabric strips.

In order to completely form a fabric tube from the composite fabric strip just described, the composite strip is passed over a roller 30 and beneath another roller 31 disposed in a proper angular relationship with respect to the roller 30 so as to permit the edges 16, 17 to be folded over in the manner illustrated in Figure 1, whereby the adhesive surface 17a will now be positioned face upwardly on the composite strip.

The composite strip, after being folded upon passage beneath the roller 31, is passed over a similar roller arrangement whereby the edges 18, 19 are folded upon the edges 16, 17 so that the adhesive surface 18a is positioned above the adhesive surface 17a as illustrated in Figure 2, this folding operation being performed at the folding station B indicated in dotted lines.

The fabric strip discharges from the folding station B arranged in the manner illustrated in Figure 2 with the two adhesive surfaces 17a and 18a in face engagement. It will now be seen that the entire inner and outer surfaces of the fabric tube thus formed are fabric surfaces and that the thermoplastic material is retained between the fabric strips so that the tube is impermeable to fluids. The seam flap formed by the edge portions 20 and 20a complete the double walled structure of the tube so that the entire tube is a double walled structure.

After the folded tube leaves the folding station B it passes under a heating table 31 to place the heat close to the surfaces being joined whereby to heat the thermoplastic material between the fabric sheets and especially the thermoplastic material upon the flap edges 17a and 18a. The tube may be held in engagement with the table by means of a roller 32 if desired.

Immediately after the tube is passed over the heating table 31, the tube passes between the pressure rolls 33 and 34 whereby to cause adherence between the flap portions 20 and 20a due to the heating and softening of the thermoplastic material upon the flap surfaces 17a and 18a.

If desired, the flap portions 20 and 20a may be made slightly wider than illustrated in the drawings so that they will overlap the face of the adjacent edges of the main body of the tube instead of providing a butt joint as illustrated in Figure 2. Also, it is entirely feasible to assemble the two fabric strips and fold the same into the tubular arrangement before causing adherence between the fabric strips so that passage over a single heating table, after leaving the last folding station B, will heat and soften the plastic material for producing adherence between the strips of fabric material as well as causing adherence between the flap edges 20 and 20a, thus eliminating the intermediate heating table 21. Also, it will readily be recognized that the invention is not limited to the use of any particular thermoplastic material, but any of the well known and commonly used thermoplastics can be utilized for coating the surface of the fabric strips.

The construction of the fabric tube is subject to modification as illustrated in Figure 6 wherein a strip of fabric material has been coated on one side only with a thermoplastic material in the conventional manner as illustrated by the process shown in Figure 3. If a single walled tubular structure is desired, it can be provided by securing a narrow fabric binding strip 35 to one edge of the coated fabric strip 10b and secured thereto by heating the thermoplastic material and applying pressure upon the strip. The opposite edge of the strip 10b may be then brought into engagement with the face surface of the fabric strip 35 that is coated with a thermoplastic material so as to bind the opposite edge of the fabric strip 10b to the strip 35. It is thus possible to provide a single walled tube that is impermeable to fluids and use the thermoplastic material of the coating surface for obtaining an impermeable seam joint.

The invention thus illustrated and described is considered as one specific form of the invention by which an impervious fabric tube can be produced and the apparatus illustrated for folding the tube is merely illustrative of any suitable folding apparatus for producing the desired folds in the fabric strips, and that while the fabric tube has been shown and described as a double walled tube, that a greater number of layers of fabric can be secured together to form a tube having any desired number of layers to thereby form a multiple walled tube.

Also, the invention has been illustrated and described with regard to fabric strips that are coated with a thermoplastic material on only one side thereof. However, the invention is not limited to this particular structure because the tube can be formed from fabric strips that are coated with plastic material on both sides thereof by merely placing a layer of material between the inner walls of the tube that will not adhere to the plastic material and which can be removed after the seam joint of the tube has been sealed.

Such an arrangement is illustrated in Figure 7 wherein the fabric strips 50 and 51 are coated with a thermoplastic material on both sides thereof. A layer, or strip, of material to which plastic will not adhere, such as wax paper 52, is placed upon the fabric strips prior to folding and the tube folded thereover to the position as illustrated in Figure 7. When the thus constructed fabric tube is heated to cause adherence between the walls thereof and over the seam joint, the inner walls of the folded tube will not adhere together. The strip 52 can be removed from the tube after manufacture thereof if desired.

While the drawings illustrate preferred forms of the invention, yet it will be understood that alterations to the process and the product can be made without departing from the spirit of the invention, and that all modifications that fall within the scope of the appended claims are intended to be included herein.

Having thus fully described our invention, what we claim as new and desire to secure by Letters Patent is:

1. The method of producing a fluid impervious fabric tube that includes, coating a pair of fabric strips with a fluid impervious thermoplastic resin on at least one side thereof to fill the interstices of the fabric and render the fabric impervious to the passage of fluid, bringing the coated pair of fabric strips into engagement with one another so that the thermoplastic coating on each of the strips engage one another, arranging the strips upon engagement with one another so that a portion of one of the longitudinal edges of each of the strips extends beyond the longitudinal edge of the opposite strip whereby a longitudinally extending exposed thermoplastic coated surface is provided along opposite edges of the combined or composite strip with the coated faces being positioned so as to face in opposite directions, folding the opposite edges of the combined or composite strip longitudinally thereof to form a seam in which one of the exposed coated edges faces upwardly and other exposed coated edge faces downwardly whereby the said exposed coated surfaces are brought into face engagement, heating the composite strip to soften the thermoplastic coatings, and applying pressure upon opposite sides of the so folded composite strip to produce adherence between the fabric strips including the seam thereof by means of only the thermoplastic coatings upon setting thereof.

2. The method of producing a fluid impervious fabric tube that includes, coating a pair of fabric strips with a fluid impervious thermoplastic resin on at least one side thereof to fill the interstices of the fabric and render the fabric impervious to the passage of fluid, bringing the coated pair of fabric strips into engagement with one another so that the thermoplastic coating on each of the strips engage one another, arranging the strips upon engagement with one another so that a portion of one of the longitudinal edges of each of the strips extends beyond the longitudinal edge of the opposite strip whereby a longitudinally extending exposed thermoplastic coated surface is provided along opposite edges of the combined or composite strip with the coated faces being positioned so as to face in opposite directions, applying heat to the so-arranged fabric strips to soften the thermoplastic coating thereon, applying pressure upon the heated fabric strips whereby to cause adherence therebetween by means of only the softened thermoplastic coating thereon upon setting thereof, folding the opposite edges of the combined or composite strip longitudinally thereof to form a seam in which one of the exposed coated edges faces upwardly and the opposite exposed coated edge faces downwardly whereby the said exposed coated surfaces are brought into face engagement, heating the composite strip to again soften the thermoplastic coatings, and applying pressure upon opposite sides of the so folded composite strip to produce adherence between the fabric strips along the seam by means of only the thermoplastic coatings upon setting thereof.

3. The method of producing a fluid impervious fabric tube having an outer fabric exposed surface by a continuous process that includes, coating a pair of fabric strips with a fluid impervious thermoplastic resin on at least one side thereof to fill the interstices of the fabric and render the fabric impervious to the passage of fluid, bringing the coated pair of fabric strips into engagement with one another so that the surfaces coated with the thermoplastic material are in face contact and the outer exposed surfaces of the composite assembled strip are fabric surfaces and arranging the strips upon engagement with one another so as to provide an exposed coated surface extending longitudinally along opposite edges of the composite strip with the coated face surfaces thereof positioned in opposite directions, folding the composite strip longitudinally to bring the exposed coated surfaces extending longitudinally along the edges of the composite strip into face contact with one another in a seam joint, and applying heat to at least one side of the so folded composite strip and pressure upon opposite sides thereof to soften the thermoplastic coatings thereon and cause adherence therebetween including the seam joint by only the coating upon setting thereof.

4. The method of producing a fabric tube having an outer fabric exposed surface by a continuous process that includes, bringing together a pair of fabric strips having a fluid impervious thermoplastic resin coating thereon into engagement with one another so that the surfaces coated with the thermoplastic material are in face contact whereby the outer exposed surfaces of the composite assembled strip are fabric surfaces and arranging the strips upon engagement with one another so as to provide an exposed coated surface extending longitudinally along opposite edges of the composite strip with the coated face surfaces thereof positioned in opposite directions, applying heat and pressure to the composite strip whereby to soften the thermoplastic coatings and cause adherence between the strips over the area thereof wherein the coated surfaces of the strips are in face contact by only the coating upon setting thereof, folding the composite strip longitudinally to form a seam and to bring the exposed coated surfaces extending longitudinally along the edges of the composite strip into face contact with one another, and applying heat to at least the seam portion of the so folded composite strip and pressure upon opposite sides thereof to soften the thermoplastic coatings on the said seam surfaces and cause adherence therebetween by only the coating upon setting thereof.

5. The method of producing a double walled fabric tube impermeable to fluids by a continuous process that includes, bringing together a pair of fabric strips having a fluid impermeable thermoplastic resin coating applied substantially uniformly over at least one of the surfaces of each of the strips to fill the interstices of the fabric to render the same impervious to the passage of fluid so that the thermoplastic coated surfaces are in face contact, arranging the strips upon engagement so as to expose an edge portion of each of the strips whereby to provide an exposed coated surface extending longitudinally along opposite edges of the assembled or composite strip the faces of which face in opposite directions, applying heat and pressure to the assembled or composite strip to soften the thermoplastic coatings on the individual strips and cause adherence therebetween by only the coating upon subsequent chilling thereof, folding the assembled or composite strip longitudinally thereof to form a seam and bring the exposed coated surfaces along the opposite edges into face contact with the extreme edges of the individual strips in at least abutting relationship, applying heat to at least one side of the so folded composite strip whereby to soften the thermoplastic coatings in at least the seam portion of the strip, and applying pressure upon opposite sides of the composite strip at least in the seam portion thereof covering the so heated overlapping edges whereby to cause adherence therebetween by only the coating upon chilling of the thermoplastic coatings, whereby a completely double walled fabric tube is provided having a continuous thermoplastic resin coating between the walls thereof.

6. A fabric tube that includes, a pair of fabric strips, each having a fluid impervious thermoplastic resin coating on one side thereof filling the interstices against passage of fluid therethrough and positioned upon one another with the thermoplastic coatings in face engagement securing the strips together thereby and with an edge portion of each of the strips extending beyond a corresponding edge of the opposite strip whereby to provide an exposed coated surface extending longitudinally along opposite edges of the strip that are positioned to face in opposite directions, the coated surfaces of said extending edges being positioned in face engagement whereby to seal said edges together only by the coating on the said edges and form thereby a closed fabric tube of uniform cross-sectional wall thickness.

7. The method of producing a multiple walled fabric tube impermeable to fluids by a continuous process that includes, bringing together a plurality of fabric strips having a fluid impermeable thermoplastic resin coating applied substantially uniformly over both surfaces of each of the strips so that a pair of the thermoplastic coated surfaces of the respective strips are in face contact, arranging the strips upon engagement so that an edge portion of each of the strips extends beyond the edge of the cooperating strip, the overlap formed thereby extending longitudinally along opposite edges of the assembled or composite strip, folding the assembled or composite strip longitudinally thereof upon a strip of material to which thermoplastic material will not adhere so as to bring the overlap edges of the composite strip into face contact, said last mentioned strip preventing adherence of adjacent coated surfaces that are brought into face to face relationship by the folding operation, applying heat and pressure to the assembled or composite strip to soften the thermoplastic coatings on the individual strips and cause adherence therebetween by only the plastic coatings upon subsequent chilling of the coatings.

CHARLES S. HYATT.
HAROLD H. BROOKS.

REFERENCES CITED

The following references are of record in the file of this patent:

UNITED STATES PATENTS

| Number | Name | Date |
| --- | --- | --- |
| 1,062,002 | Harbeck | May 20, 1913 |
| 2,358,743 | Smith | Sept. 19, 1944 |
| 1,281,356 | Harbeck | Oct. 15, 1918 |
| 747,332 | Sacksenroder | Dec. 15, 1903 |
| 2,083,969 | Walter | June 15, 1937 |
| 1,897,998 | Brady et al. | Feb. 21, 1933 |
| 941,605 | Baekeland | Nov. 30, 1900 |